United States Patent [19]

Inaba

[11] Patent Number: 4,665,692

[45] Date of Patent: May 19, 1987

[54] ENGINE EXHAUST CONTROL SYSTEM

[75] Inventor: Motohiro Inaba, Fujisawa, Japan

[73] Assignee: Nissan Motor Company, Limited, Japan

[21] Appl. No.: 816,435

[22] Filed: Jan. 6, 1986

[30] Foreign Application Priority Data

Jan. 11, 1985 [JP] Japan ................................ 60-2128[U]

[51] Int. Cl.⁴ ............................................... F01N 7/00
[52] U.S. Cl. ....................................... 60/324; 60/312; 181/226; 181/254; 181/239; 123/323
[58] Field of Search ................. 123/323; 60/312, 324, 60/292, 294; 181/236, 239, 226, 254

[56] References Cited

U.S. PATENT DOCUMENTS

| | | | |
|---|---|---|---|
| 2,072,372 | 3/1937 | Kingsley | 181/254 |
| 2,730,090 | 1/1956 | Hall | 123/323 |
| 3,368,345 | 2/1968 | Walker | 123/323 |
| 3,751,921 | 8/1973 | Blomberg et al. | 60/324 |
| 4,100,737 | 7/1978 | Sugiliara | 60/292 |
| 4,149,618 | 4/1979 | Horie | 123/323 |

FOREIGN PATENT DOCUMENTS 59-102922  3/1984  Japan.
59-156104  7/1984  Japan.

*Primary Examiner*—Ira S. Lazarus
*Attorney, Agent, or Firm*—Leydig, Voit & Mayer

[57] ABSTRACT

An exhaust control system for use in an internal combustion engine for controlling the flow of exhaust gases discharged from the engine to the atmosphere. The apparatus determines a first condition representing the engine speed being higher than a predetermined value, a second condition representing the transmission being not in neutral, and a third condition representing the throttle valve being not at or near its closed position. A control circuit generates a command signal only upon simultaneous occurrence of the first, second and third conditions. The apparatus includes a device responsive to the command signal from the control circuit for increasing the effective area of the exhaust passage.

2 Claims, 1 Drawing Figure

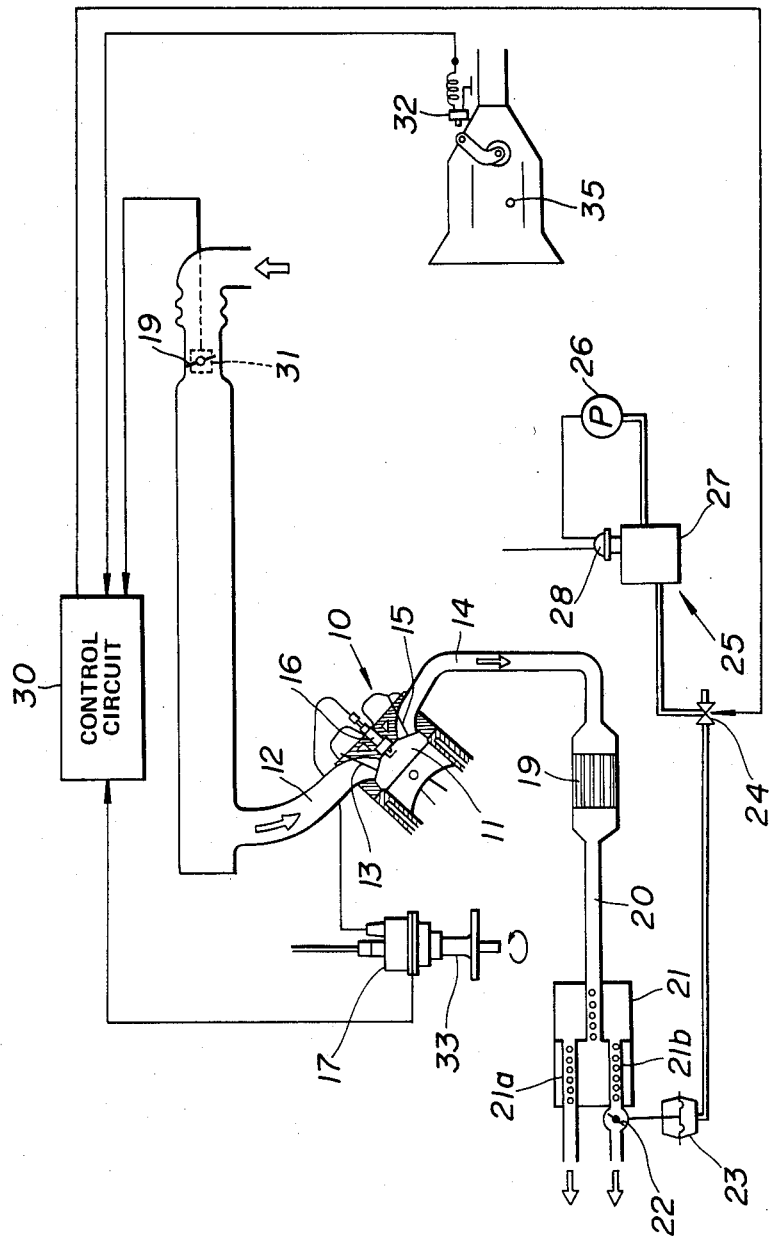

ENGINE EXHAUST CONTROL SYSTEM

BACKGROUND OF THE INVENTION

This invention relates to an exhaust control system for use in an internal combustion engine for controlling the flow of exhaust gases discharged from the engine to the atmosphere in accordance with engine operating conditions.

Exhaust gases are discharged from an engine to the atmosphere through an exhaust system which includes a catalytic converter, a pre-muffler and a main muffler placed in an exhaust passage extending from the exhaust manifold of the engine. The exhaust passage has an effective area through which exhaust gases are discharged to the atmosphere. The exhaust passage effective area is determined in view of such factors as desired engine exhaust pressure and low-frequency pulsation sound arresting effect. The greater the exhaust passage effective are, the smaller the engine exhaust pressure, whereas the smaller the exhaust passage effective area, the greater the sound arresting effect. In order to provide adequate engine exhaust pressure, the exhaust passage effective area must be relatively large. However, a large exhaust passage effective area results in an excessive drop of pulsation sound arresting effect at low engine speeds. In addition, an attempt to ensure sufficient pulsation sound arresting effect by decreasing the exhaust passage effective area will cause an excessive increase of engine exhaust pressure which results in an excessive engine output reduction at high engine speeds.

This delemma can be overcome by using a control valve to change the effective area of the exhaust passage in accordance with engine speed, as disclosed, for example, in Japanese Utility Model Kokai Nos. 59-102922 and 59-156104. The control valve remains closed to restrict a part of exhaust gas flow through the exhaust passage at low engine speeds and opens to increase the effective area of the exhaust passage at high engine speeds so as to ensure both sufficient pulsation sound arresting effect at low engine speeds and sufficient exhaust pressure reduction at high engine speeds.

With such apparatus which include a control valve operable to change the effective area of the exhaust passage in accordance with engine speed, however, the columnar resonance will increase in the exhaust system, causing a high level alternant due to emission of impact waves to the exterior during deceleration while the control valve remains open to widen the exhaust passage effective area. This is true particularly when rapid deceleration is resumed after rapid acceleration.

Therefore, the present invention provides an engine exhaust control system which is free from the above described disadvantages.

SUMMARY OF THE INVENTION

There is provided, in accordance with the present invention, an apparatus for use in an internal combustion engine including an exhaust passage having an effective area through which exhaust gases are discharged to the atmosphere. The apparatus includes means for determining a first condition representing the engine speed being higher than a predetermined value, means for determining a second condition representing the transmission being not in neutral, and means for determining a third condition representing the throttle valve being not at or near its closed position. A control circuit generates a command signal only upon simultaneous occurrence of the first, second and third conditions. The command signal is applied to a means which thereby increases the effective area of the exhaust passage.

During acceleration or normal engine operation at high engine speeds, the first, second and third conditions occur simultaneously, the effective area of the exhaust passage increases so as to reduce the exhaust pressure. It is known that no exhaust pulsation sound problem occur at high engine speeds. When deceleration occurs, the throttle valve returns to its closed position. As a result, the exhaust passage effective area decreases so as to partially restrict the flow of exhaust gases through the exhaust passage. Such a small exhaust passage effective area results in an increased pulsation sound arresting effect and an increased damping effect due to an exhaust gas flow rate increase, thereby reducing the alternant level. In addition, if the transmission is not in neutral, the exhaust passage exhaust pulsation sound remains at a low level even if the engine is idling.

BRIEF DESCRIPTION OF THE DRAWINGS

The details as well as other features and advantages of the present invention are set forth below and are shown in the accompanying drawing, in which:

The single FIGURE is a schematic diagram showing one embodiment of an engine exhaust control system made in accordance with the present invention.

DETAILED DESCRIPTION OF THE INVENTION

With reference to the single FIGURE of the drawing, there is shown a schematic diagram of an engine exhaust control system embodying the method and apparatus of the present invention. An internal combustion engine, generally designated by the numeral 10, for an automotive vehicle includes a combustion chamber or cylinder 11. An intake manifold 14 is connected with the cylinder 11 through an intake port with which an intake valve 13 is in cooperation. The intake valve 12 is slidably mounted within the top of the cylinder 11 and it regulates the entry of combustion ingredients into the cylinder 11 from the intake manifold 12. An exhaust manifold 14 is connected with the cylinder 11 through an exhaust port with which an exhaust valve 15 is in cooperation. The exhaust valve 15 is slidably mounted in the top of the cylinder 11 and it regulates the exit of combustion products, exhaust gases from the cylinder 11 into the exhaust manifold 14. A spark plug 16 is mounted in the top of the cylinder 11 for igniting the combustion ingredients within the cylinder 11 when the spark plug 16 is energized. For this purpose, the engine includes a distributor 17 which is connected with an ignition coil (not shown) to energize the spark plug 16. The distributor 17 has a rotor which is drivingly connected to the engine crankshaft in such a fashion that the rotor is driven at one-half the rotation velocity of the crankshaft.

The amount of air permitted to enter the combustion chamber 11 through the intake manifold 12 is controlled by a butterfly throttle valve 19. The throttle valve 19 is drivingly connected to an accelerator pedal (not shown). The degree to which the accelerator pedal is depressed controls the degree of rotation of the throttle valve 19. The greater the depression of the accelerator pedal, the greater the amount of air permitted to enter the intake manifold 12. The accelerator pedal is manually controlled by the operator of the engine exhaust control system.

The exhaust gases are discharged through the exhaust manifold 14 to a catalytic converter 19 which is in turn connected to the atmosphere through an exhaust system which includes an exhaust pipe 20 and a main muffler 21. The main muffler 21 has two separated tail tubes 21a and 21b opening to the atmosphere. A control valve 22 is provided for movement between a fully-closed position and a fully-open position in one of the tail tubes, for example, the tail tube 21b. At the fully-closed position, the control valve 22 closes the tail tube 21b to restrict the effective area of the exhaust system through which the exhaust gases are discharged to the atmosphere.

The position of the control valve 22 is changed by a control valve drive unit which is shown as including a diaphragm type pressure responsive actuator 23, a change-over valve 24, and a vacuum source 25. The vacuum source 25 includes a vacuum pump 26 operable to produce a negative pressure when connected to a source of power (not shown). The produced negative pressure is introduced into a vacuum tank 27. The negative pressure is retained substantially at a constant level by means of a vacuum responsive switch 28 which selectively connects or disconnects the vacuum pump 26 from the power source in response to the negative pressure level in the vacuum tank 27. The change-over valve 24 selectively connects the pressure responsive actuator to the vacuum source or to the atmosphere in response to a command signal fed thereto from a control circuit 30.

The control circuit 30 determines a specified mode of engine operation and produces a command signal to the change-over valve 24 based upon various conditions of the engine that are sensed during its operation. These sensed conditions include throttle valve position, engine speed, transmission gear position. Thus, a throttle switch 1, a neutral switch 32, and a crankshaft position sensor 33 are connected to the control circuit 30.

The throttle switch 1 closes to apply an ON signal having a logic 1 level to the control circuit 30 only when the throttle valve 19 is at or near its fully-closed position. Otherwise, the throttle switch 31 remains open. The neutral switch 2 closes to apply an output in the form of an ON signal having a logic 1 level to the control circuit 30 only when the transmission 35 is in neutral. Otherwise, the neutral switch remains open. The crankshaft position sensor 33 senses rotation of the distributor rotor and produces a series of crankshaft position electrical pulses of a repetition rate directly proportional to engine speed. The control circuit 12 calculates a value for engine speed based upon the pulse signal fed from the crankshaft position sensor 33 and compares the calculated value with a predetermined value, for example, 3500 rpm. It is to be understood that these sensors and the vacuum source are not necessarily provide only for the engine exhaust control apparatus and may be used commonly with the engine control system and/or the vehicle speed control system employed in the automotive vehicle.

The control circuit 30 generates a command signal only upon the occurrence of three conditions; namely, vehicle engine speed in excess of a predetermined value, for example, 3500 rpm, opening of the throttle switch, and opening of the neutral switch. The command signal is applied to the change-over valve 24 which thereby moves to a position connecting the vacuum source to the pressure responsive actuator 23 to open the control valve 22 so as to widen the effective area of the exhaust system through which the exhaust gases are discharged to the atmosphere only when the three conditions are fulfilled, that is, when the engine speed is higher than a predetermined value, the transmission is not in neutral, and the throttle valve is not at or near its fully-closed position. In other words, the effective area of the exhaust system is widened to reduce the exhaust pressure when the engine speed is over a predetermined value in the acceleration or steady mode of engine operation. Except for the simultaneous occurrence of the three conditions, no command signal is applied to the change-over valve 24 and it remains connecting the atmosphere to the pressure responsive actuator 23. Under such conditions, the pressure responsive valve 23 retains the control valve 22 closed so as to restrict the effective area of the exhaust system through which the exhaust gases are discharged to the atmosphere. In other words, the effective area of the exhaust system is restricted to provide sufficient exhaust sound arresting effect and increase the engine brake effect in the idle and deceleration modes of engine operation.

While the engine 10 as illustrated in the drawing shows only one combustion chamber 11 formed by a cylinder and piston, nevertheless it should be understood that the particular engine exhaust control system described herein is designed for use on engine of any design. In addition, while the present invention has been described in connection with a specific embodiment thereof, it is evident that many alternatives, modifications and variations will be apparent to those skilled in the art. For example, the control valve drive unit is not limited in any way to the illustrated one and may be taken in any form as long as it can close the control valve 22 in the presence of a command signal from the control circuit 30. The control valve drive unit may utilize the negative pressure produced in the intake manifold of the engine or the exhaust pressure produced in the exhaust manifold of the engine to move the control valve 22. The control valve may be provided in another position of the exhaust system to vary the effective area of the exhaust passage through which the exhaust gases are discharged to the atmosphere. Accordingly, it is intended to embrace all alternatives, modifications, and variations that fall within the spirit and broad scope of the appended claims.

What is claimed is:

1. An apparatus for use in an internal combustion engine including a throttle valve, a transmission, and an exhaust passage having an effective area through which exhaust gases are discharged to the atmosphere, comprising:
    means for determining a first condition representing the engine speed being higher than a predetermined value;
    means for determining a second condition representing the transmission being not in neutral;
    means for determining a third condition representing the throttle valve being not at or near its closed position;
    a control circuit for generating a command signal only upon simultaneous occurrence of the first, second and third conditions; and
    means responsive to the command signal from the control circuit for increasing the effective area of the exhaust passage.

2. The apparatus as claimed in claim 1, wherein the exhaust passage has a downstream end portion divided into at least two branches, and wherein the effective area increasing means includes:

a valve provided in one of the exhaust passage branches, the valve being at a closed position to close the one exhaust passage branch; and drive means responsive to the command signal from the control circuit for moving the valve to an open position to open the one exhaust passage branch, thereby increasing the effective area of the exhaust passage.

* * * * *